Feb. 15, 1955     L. R. BLAKE ET AL     2,702,004
LINEAR POLYPHASE ELECTROMAGNETIC PUMP
Filed July 21, 1952
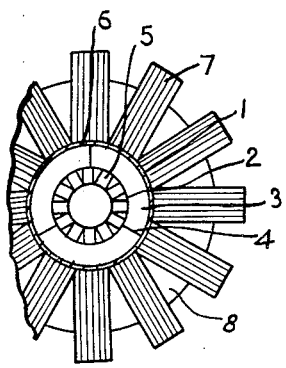
Fig. 1.
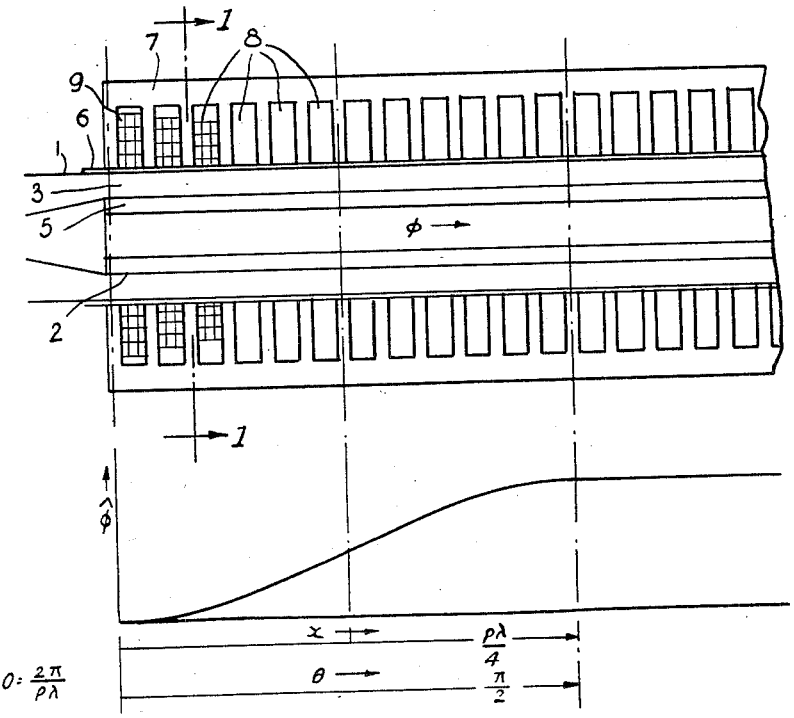
Fig. 2.
Fig. 3.
INVENTORS
LESLIE REGINALD BLAKE,
ARTHUR HEMBOROUGH MAGGS,
BY Miles S. Pillans
ATTORNEY

United States Patent Office 2,702,004
Patented Feb. 15, 1955

2,702,004

LINEAR POLYPHASE ELECTROMAGNETIC PUMP

Leslie R. Blake and Arthur H. Maggs, Rugby, England, assignors to The British Thomson-Houston Company Limited, a British company Application July 21, 1952, Serial No. 299,944

4 Claims. (Cl. 103—1)

This invention relates to dynamo-electric machines and more particularly to electro-magnetic pumps.

In a polyphase alternating current electro-magnetic pump of the travelling field type in which the liquid to be pumped, lies within, either a rectangular tube with the inducing element disposed on one or both sides of the tube, or an annular tube with the inducing element disposed around the outer surface, or both outer and inner surfaces as convenient, a considerable loss of energy occurs on entry into and exit from the region of the magnetic field when a uniformly distributed inducing winding is employed. This energy loss results from eddy currents in the liquid generated, partly by a pulsating flux extending throughout the length of the pump, and partly by motion of the liquid in the gap flux at the ends of the pump.

The object of the present invention is to increase the efficiency of a travelling field pump by minimizing the eddy currents in the liquid produced as described above, and hence the losses resulting from them.

The invention consists in providing a polyphase alternating current electro-magnetic pump of the type above referred to with an inducing winding which is so graded that the maximum instantaneous value of the magnetic flux density in the liquid increases gradually from zero or a low value at each end of the pump to a maximum at the middle or to a constant value over a length at the middle.

Almost any grading will reduce losses as compared with those resulting from an ungraded winding, but a preferred grading is that in which the maximum instantaneous value of magnetic flux coaxial with the tube varies as $\sin^2\theta$, where $\theta=0$ at the end and $\pi/2$ at the point at which grading ceases and the ungraded portion, if any begins. This grading ensures that both the axial flux and the flux density in the liquid are zero at the ends, and also that both match the corresponding quantities at the points where the graded portions are joined to the ungraded portion, if any. The flux density in the liquid is proportional to the first derivative of the axial flux, and the ampere conductors are proportional to the second derivative.

If, with the preferred grading mentioned above, the two graded end portions together occupy $p$ poles ($p$ need not be integral) the resultant travelling axial flux wave (in the graded portions only) consists of three uniform travelling waves, one of half maximum magnitude having $p$ poles, and the other two, each of quarter maximum magnitude, having $p+2$ poles and $p-2$ poles respectively. The additional loss in the graded portions as compared with the loss in a uniform length of the same number of poles arises because of the differing slips relative to the component waves, and in practice would be due mainly to the high slip relative to the wave of $p-2$ poles. As the magnitude of the flux density in the liquid due to this wave is small, this loss is not large provided that $p$ is not made too small.

The invention will now be described with reference to the accompanying drawings in which Fig. 1 is an end view taken on line 1—1 of Fig. 2, and Fig. 2 is a longitudinal cross sectional view of an electro-magnetic pump having an annular tube, and Fig. 3 represents the maximum instantaneous value of the axial magnetic flux along the pump.

In Figs. 1 and 2, 1 and 2 represent the outer and inner walls respectively of the annular tube and 3 the annulus which is occupied by the liquid to be pumped. The inner wall 2 is supported by longitudinal vanes 4 from the outer walls. Around the inside surface of the inner tube are packets 5 of strip laminations arranged radially. Around the outside surface of the outer tube is a tube of insulating material 6, and around this tube arranged radially are packets of laminations 7 which are slotted throughout their length to carry a number of pancake coils 8 concentric with the tube. The laminated structure of the core around tube 6 is shown in Fig. 1, which also discloses an end of one of the pancake coils 8 positioned in a core slot. Cross sections 9 of pancake coils 8 are schematically shown in only three of the slots in Fig. 2, and it will be understood that this showing is exemplary of the coils 8 located in each of the slots. Each of the coils 8 is so designed that when fed with alternating current at a given frequency and suitable phase, which latter will vary from coil to coil, a travelling wave of alternating magnetic flux is maintained throughout the length of the pump such that the maximum instantaneous value is represented by the curve of Fig. 3. In Fig. 3, the maximum instantaneous value of axial flux $\phi$ is plotted against distance along the tube $x$. $\theta$ is also the distance along the tube from either end of the graded portion only in units chosen to make $\theta=\pi/2$ at the point where the graded joins the ungraded portion. At this point $$x=\frac{p\lambda}{4}$$

where $\lambda$ is the wave length of the flux wave, i. e. the length occupied by two poles, and $p$ is the number of poles occupied by the two graded portions. Thus over the graded portion only, measured from either end, $$\theta=\frac{2\pi x}{p\lambda}$$

and $$\phi=\phi_{max}\sin^2\theta$$

The chain dotted lines indicate points spaced apart by a pole pitch, and it will be seen that Fig. 3, has been drawn for the particular case of $p=4$. Thus, in this case, the three uniform travelling fluxes, over the graded portions only, have numbers of poles 4, 6 and 2 respectively.

What we claim as new and desire to secure by Letters Patent of the United States is:

1. A polyphase alternating current electromagnetic pump including, in combination, a conduit for liquids, a plurality of induction coils positioned adjacent to and along the axis of said conduit and adapted to be connected to a suitable source of polyphase current, said coils being graduated from a low inductive value at each end of said conduit to a maximum value at the middle of said conduit, whereby the maximum instantaneous value of the magnetic flux density produced by said coils within said conduit increases gradually from zero or a low value at each end of said conduit to a maximum value at the middle of said conduit.

2. A polyphase alternating current electromagnetic pump including, in combination, a conduit for liquids, a plurality of induction coils positioned adjacent to and along the axis of said conduit and adapted to be connected to a suitable source of polyphase current, said coils being graduated in inductive value over a portion of said conduit at each end thereof from a low value at each end of said conduit to a higher constant value over the remaining ungraduated length of said conduit, whereby the instantaneous magnetic flux density produced by said coils within said conduit gradually increases from zero or a low value at each end of said conduit to a higher constant value over the remaining ungraduated length of said conduit.

3. A polyphase alternating current electromagnetic pump including, in combination, a conduit for liquids, a plurality of induction coils positioned adjacent to and along the axis of said conduit and adapted to be connected to a suitable source of polyphase current, said coils being graduated in inductive value from a low value at each end of said conduit to a maximum value at the middle of said conduit, a resultant magnetic flux produced by said graduated coils within said conduit, said flux having a maximum instantaneous density over said graduated portion of said coils equal to $\sin^2 \theta$, where $\theta$ equals the angular distance from each end along the axis of the conduit.

4. A polyphase alternating current electromagnetic pump including, in combination, a conduit for liquids, a plurality of induction coils positioned adjacent to and along the axis of said conduit and adapted to be connected to a suitable source of polyphase current, said coils being graduated from a low inductive value at each end of said conduit to a maximum value at the middle of said conduit, a resultant magnetic flux produced by said graduated coils within said conduit, said flux having a maximum instantaneous density over said graduated portion of said coils equal to $\sin^2 \theta$, where $\theta$ equals the angular distance from each end along the axis of the conduit, and wherein $\theta$ equals zero at the end of said conduit and $\pi/2$ at the middle of said conduit.

References Cited in the file of this patent

UNITED STATES PATENTS

| | | |
|---|---|---|
| 618,578 | Newcomb | Jan. 31, 1899 |
| 1,298,664 | Chubb | Apr. 1, 1919 |
| 2,224,505 | Unger | Dec. 10, 1940 |

FOREIGN PATENTS

| | | |
|---|---|---|
| 543,214 | Germany | Feb. 3, 1932 |